US012158086B2

United States Patent
(12) United States Patent
Humes

(10) Patent No.: US 12,158,086 B2
(45) Date of Patent: Dec. 3, 2024

(54) GAS TURBINE ENGINE WITH COMBUSTOR SECTION MOUNTED MODULATED COMPRESSOR AIR COOLING SYSTEM

(71) Applicant: Rolls-Royce North American Technologies, Inc., Indianapolis, IN (US)

(72) Inventor: Ryan C. Humes, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/505,595

(22) Filed: Nov. 9, 2023

(65) Prior Publication Data

US 2024/0076991 A1 Mar. 7, 2024

Related U.S. Application Data

(63) Continuation of application No. 17/880,276, filed on Aug. 3, 2022, now Pat. No. 11,867,089.

(51) Int. Cl.
*F01D 9/02* (2006.01)
*F01D 17/14* (2006.01)
*F23R 3/00* (2006.01)

(52) U.S. Cl.
CPC ........... *F01D 9/023* (2013.01); *F01D 17/145* (2013.01); *F23R 3/002* (2013.01); *F05D 2240/35* (2013.01); *F05D 2260/232* (2013.01); *F05D 2260/60* (2013.01); *F23R 2900/03043* (2013.01)

(58) Field of Classification Search
CPC ........ F01D 9/023; F01D 17/145; F23R 3/002; F23R 2900/03043; F05D 2240/35; F05D 2260/232; F05D 2260/60
USPC .......................................................... 415/175
See application file for complete search history.

(56) References Cited

U.S. PATENT DOCUMENTS 4,416,111 A 11/1983 Lehahan et al.
4,462,204 A * 7/1984 Hull .......................... F23R 3/26 415/115
4,807,433 A * 2/1989 Maclin .................... F01D 5/081 415/115
4,926,633 A * 5/1990 Nash ....................... F02K 1/822 239/265.17
6,050,079 A * 4/2000 Durgin .................... F02C 7/125 415/115
8,495,883 B2 7/2013 Foust et al.
10,113,486 B2 10/2018 Mueller et al.
10,202,867 B2 2/2019 Rahaim et al.
11,073,084 B2 7/2021 Kraft et al.
11,092,013 B2 8/2021 Rahaim et al.
11,781,445 B2 * 10/2023 Shimmyo ................. F02C 7/18 415/116

(Continued)

*Primary Examiner* — J. Todd Newton
(74) *Attorney, Agent, or Firm* — Barnes & Thornburg LLP

(57) ABSTRACT

A gas turbine engine comprises a turbine, a combustor fluidly coupled to the turbine, and a cooling air system. The turbine includes including a turbine rotor having a shaft mounted for rotation about an axis of the gas turbine engine and a set of turbine blades coupled to the turbine rotor for rotation therewith. The combustor includes an outer combustor case and an inner combustor case that cooperate to define a combustion chamber. The cooling air system is configured to cool the turbine using air form the combustion chamber of the combustor.

20 Claims, 5 Drawing Sheets

(56) References Cited

U.S. PATENT DOCUMENTS

| | | | | |
|---|---|---|---|---|
| 2007/0193274 | A1* | 8/2007 | Belsom | F02C 9/18 60/773 |
| 2018/0216539 | A1* | 8/2018 | Widener | F01D 9/023 |
| 2019/0186269 | A1 | 6/2019 | Grzelecki et al. | |

* cited by examiner

GAS TURBINE ENGINE WITH COMBUSTOR SECTION MOUNTED MODULATED COMPRESSOR AIR COOLING SYSTEM

CROSS REFERENCE TO RELATED APPLICATIONS

This application is a continuation of and claims priority to and the benefit of U.S. patent application Ser. No. 17/880,276, filed Aug. 3, 2022, the disclosure of which is hereby expressly incorporated herein by reference.

FIELD OF THE DISCLOSURE

The present disclosure relates generally to gas turbine engines, and more specifically to cooling systems for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. Cooling air may be used to cool the vanes and/or the blades in the turbine. The amount of cooling may depend on a few factors such as desired life, temperatures, and/or mission.

Some portions of the mission, such as maximum takeoff, have a significant impact on life and have a large weighting in setting the amount of cooling flow. Other points, such as cruise, have lower impacts on life, but some cooling circuits may use fixed geometry designed for the extreme conditions, which leads to a fixed amount of cooling air that may exceed desired amounts for certain operating conditions. Reducing the cooling air at points like cruise can have a negligible impact on turbine life and allow for better engine efficiency at those points.

SUMMARY

The present disclosure may comprise one or more of the following features and combinations thereof.

A gas turbine engine may include a turbine, a combustor, and a cooling air system. The turbine may include a turbine rotor mounted for rotation about an axis of the gas turbine engine and a turbine blade coupled to the turbine rotor for rotation therewith. The combustor may include an outer combustor case and an inner combustor case that cooperate to define a combustion chamber. The combustor may define a cooling passage that directs air toward the turbine rotor. The inner combustor case may be formed to include a primary inlet opening that directly fluidly connects the combustion chamber and the cooling passage to conduct a flow of primary cooling air from the combustion chamber directly into the cooling passage to provide a continuous flow of primary cooling air to the cooling passage to cool the turbine.

In some embodiments, the cooling air system may include a cooling duct and a valve. The cooling duct may be arranged to extend along at least a portion of the inner combustor case to define a transfer passageway in fluid communication with the combustion chamber and the cooling passage. The valve may be coupled with the outer combustor case and fluidly connected with the cooling duct. The primary inlet opening may be unobstructed during all operating conditions of the gas turbine engine so that the flow of primary cooling air is continuously provided through the primary inlet opening and to the turbine. The valve may be configured to open and close selectively to allow and block fluid communication between the transfer passageway and the combustion chamber to modulate a flow of auxiliary cooling air conducted into the cooling passage via the transfer passageway to selectively supplement the flow of primary cooling air.

In some embodiments, the transfer passageway may be fluidly connected with the cooling passage through an auxiliary inlet opening formed in the inner combustor case. The auxiliary inlet opening may be spaced apart from the primary inlet opening. The primary inlet opening may extend radially through the inner combustor case and the auxiliary inlet opening may extend axially through the inner combustor case. The flow of auxiliary cooling air may be conducted from the combustion chamber, through the transfer passageway, and through the auxiliary inlet opening into the cooling passage to combine with the flow of primary cooling air therein to form a flow of combined cooling air. The cooling passage may include an outlet that directs the flow of combined cooling air toward the turbine.

In some embodiments, the cooling duct may include an annular manifold that extends circumferentially around the inner combustor case and fluidly connects the transfer passageway with the cooling passage. The transfer passageway may extend at least partially circumferentially about the axis. The outer combustor case may be formed to include an inlet aperture that fluidly connects the valve and the combustion chamber and an outlet aperture that fluidly connects the valve and the cooling duct to allow the flow of auxiliary cooling air to flow from the combustion chamber through the valve and into the cooling duct in response to the valve being in an open position.

In some embodiments, the entire valve may be located radially outward of the outer combustor case. The gas turbine engine may further include a controller coupled to the valve and configured to direct the valve to open in response to a high-flow condition of the gas turbine engine to allow fluid communication between the cooling duct and the combustion chamber so that the flow of auxiliary cooling air flows into the cooling passage. The gas turbine engine may further include a controller coupled to the valve and configured to direct the valve to close in response to a low-flow condition of the gas turbine engine to block fluid communication between the cooling duct and the combustion chamber so that the flow of auxiliary cooling air does not flow into the cooling passage.

In some embodiments, in response to the valve being closed, the cooling passage may receive the flow of primary cooling air from the combustion chamber through the primary inlet opening without receiving the flow of auxiliary cooling air from the cooling duct. The cooling passage may include an outlet that directs the flow of primary cooling air toward the turbine.

According to another aspect of the present disclosure, a gas turbine engine may comprise a turbine, a combustor, and a cooling air system. The turbine may have a rotor and a blade that extends radially away from the rotor relative to an axis. The combustor may define a combustion chamber, a cooling passage, and a primary inlet opening. The cooling passage may open into a cavity formed between the combustor and the turbine. The primary inlet opening may open directly into the cooling passage to fluidly connect the combustion chamber with the cooling passage and continuously direct a flow of primary cooling air from the combustion chamber through the cooling passage and into the cavity. The cooling air system may include a cooling duct and a valve. The cooling duct may be arranged to extend along the combustor to define a transfer passageway in fluid communication with the combustion chamber and the cooling passage. The valve may be coupled with the combustor and fluidly connected with the cooling duct. The valve may be configured to selectively control fluid communication between the cooling duct and the combustion chamber to modulate a flow of secondary cooling air conducted through the transfer passageway and the cooling passage into the cavity to supplement the flow of primary cooling air.

In some embodiments, the gas turbine engine may further include a controller coupled to the valve and configured to direct the valve to open in response to a high-flow condition of the gas turbine engine to allow fluid communication between the cooling duct and the combustion chamber. In response to the valve being opened, the flow of secondary cooling air and the flow of primary cooling air may combine in the cavity. The controller may be configured to direct the valve to close in response to a low-flow condition of the gas turbine engine to block fluid communication between the cooling duct and the combustion chamber. In response to the valve being closed, the flow of secondary cooling air may not combine with the flow of primary cooling air in the cavity.

In some embodiments, an outer combustor case included in the combustor may be formed to include an inlet aperture that fluidly connects the valve and the combustion chamber and an outlet aperture that fluidly connects the valve and the transfer passageway to allow the flow of secondary cooling air to flow into the transfer passageway in response to the valve being in an open position. The entire valve may be located radially outward of the combustor.

In some embodiments, the transfer passageway may be fluidly connected with the cooling passage through an auxiliary inlet opening formed in the combustor. The auxiliary inlet opening may be spaced apart from the primary inlet opening. The primary inlet opening may extend radially through the combustor to open directly into the cooling passage and the auxiliary inlet opening may extend axially through the combustor to open directly into the cooling passage. The flow of primary cooling air may be directed radially inward from the combustion chamber to the cooling passage through the primary inlet opening and the flow of primary cooling air may be directed axially aft from the cooling passage to the cavity through an outlet of the cooling passage.

According to another aspect of the present disclosure, a method of operating a gas turbine engine may include conducting a flow of primary air from within a combustion chamber of a combustor included in the gas turbine engine directly into a cooling passage via a primary inlet opening formed in the combustor during all operating conditions of the gas turbine engine. The method may include directing a flow of auxiliary air from the combustion chamber into the cooling passage to combine with the flow of primary air therein to provide a combined flow of air. The method may include directing the combined flow of air to a turbine included in the gas turbine engine.

In some embodiments, the method may include blocking the flow of auxiliary air from flowing from the combustion chamber into the cooling passage. The method may include directing only the flow of primary air from the cooling passage to the turbine after blocking the flow of auxiliary air. The method may include directing the flow of auxiliary air radially outward of an outer combustor case of the combustor from the combustion chamber and directing the flow of auxiliary air radially inward of the outer combustor case into the cooling passage after directing the flow of auxiliary air radially outward of the outer combustor case.

In some embodiments, the method may include directing the flow of primary air radially inward from the combustion chamber to the cooling passage via the primary inlet opening and directing the flow of primary air axially aft through an outlet of the cooling passage to the turbine.

These and other features of the present disclosure will become more apparent from the following description of the illustrative embodiments.

DETAILED DESCRIPTION

Figure 1:
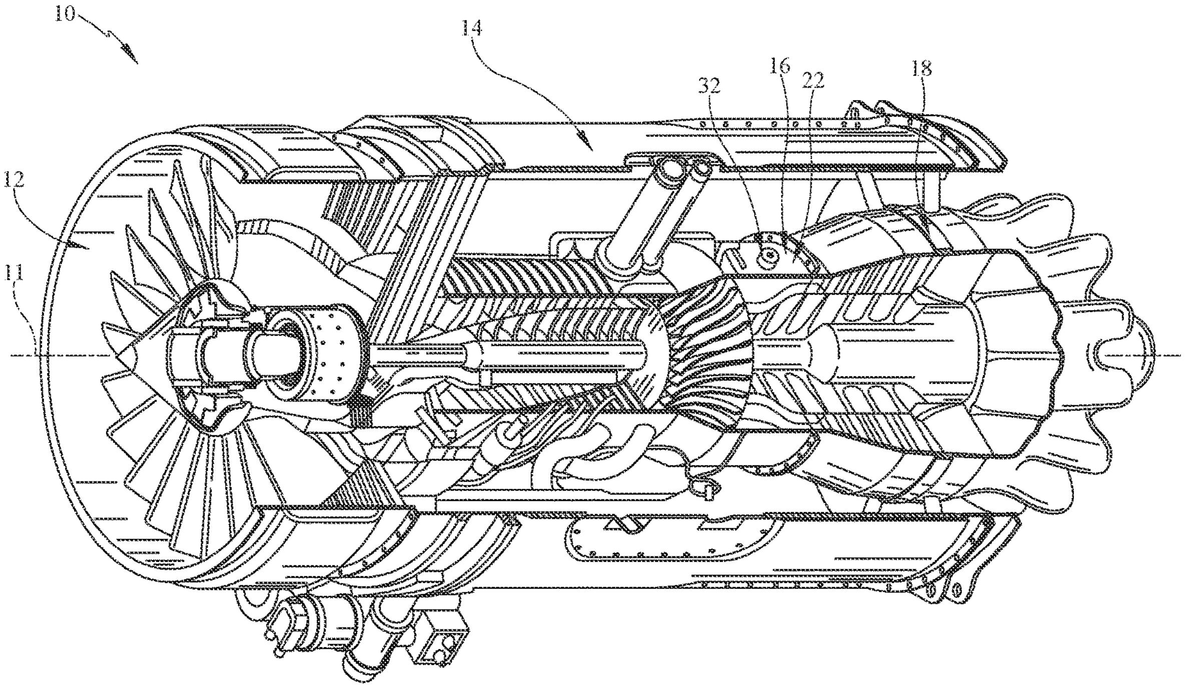
FIG. 1 is a cut away perspective view of a gas turbine engine showing the engine includes a fan, a compressor, a combustor fluidly coupled to the compressor, a turbine fluidly coupled to the combustor, and a cooling air system configured to control the amount of cooling air provided to a cavity located axially between the combustor and the turbine used to cool the turbine.

For the purposes of promoting an understanding of the principles of the disclosure, reference will now be made to a number of illustrative embodiments illustrated in the drawings and specific language will be used to describe the same.

Figure 2:
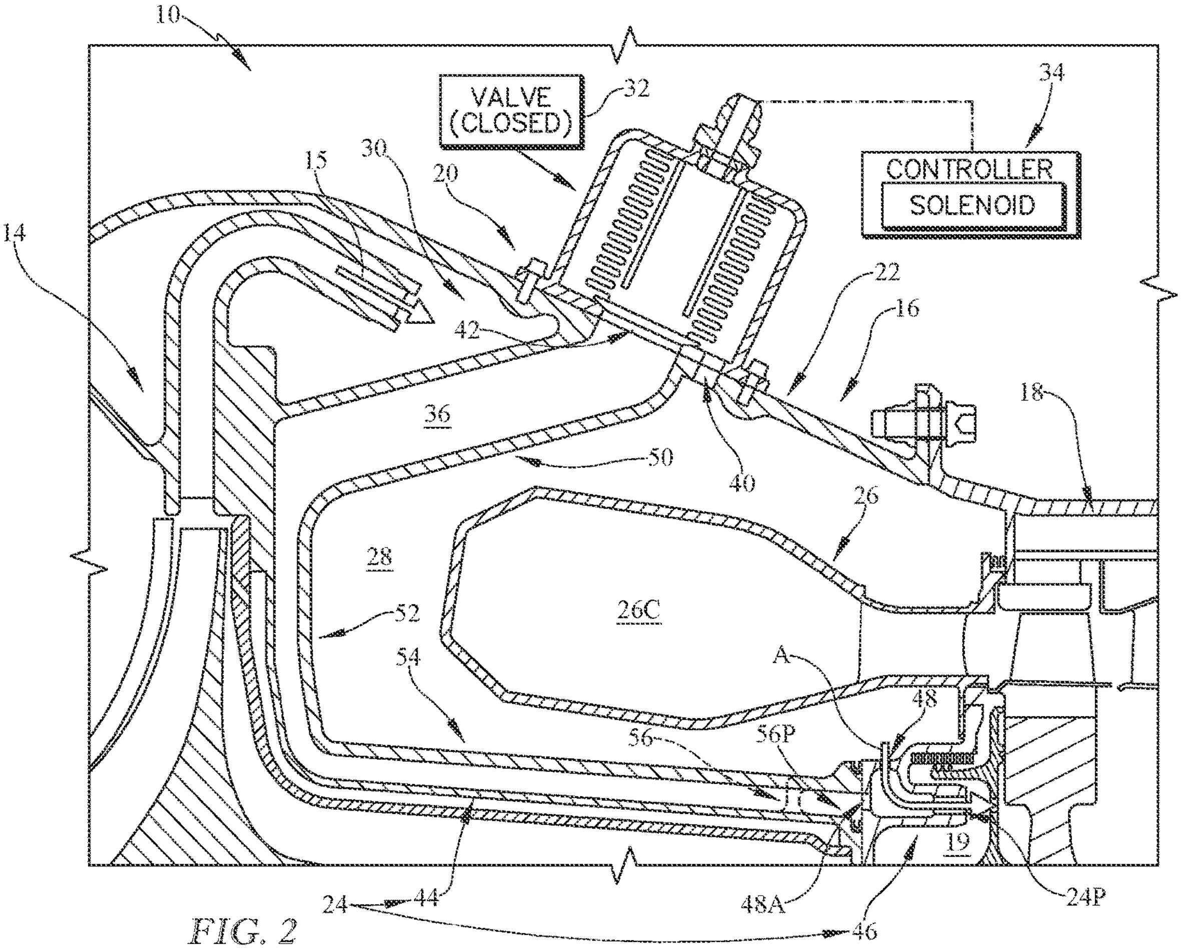
FIG. 2 is a cross section view of the gas turbine engine of FIG. 1 showing the combustor includes an outer combustor case and an inner combustor case that cooperate to define a combustion chamber, and further showing a cooling air system configured to provide a continuous minimum flow of cooling air to the turbine and to modulate selectively additional cooling air through the combustion chamber for additional turbine cooling during certain operating conditions.
Figure 3:
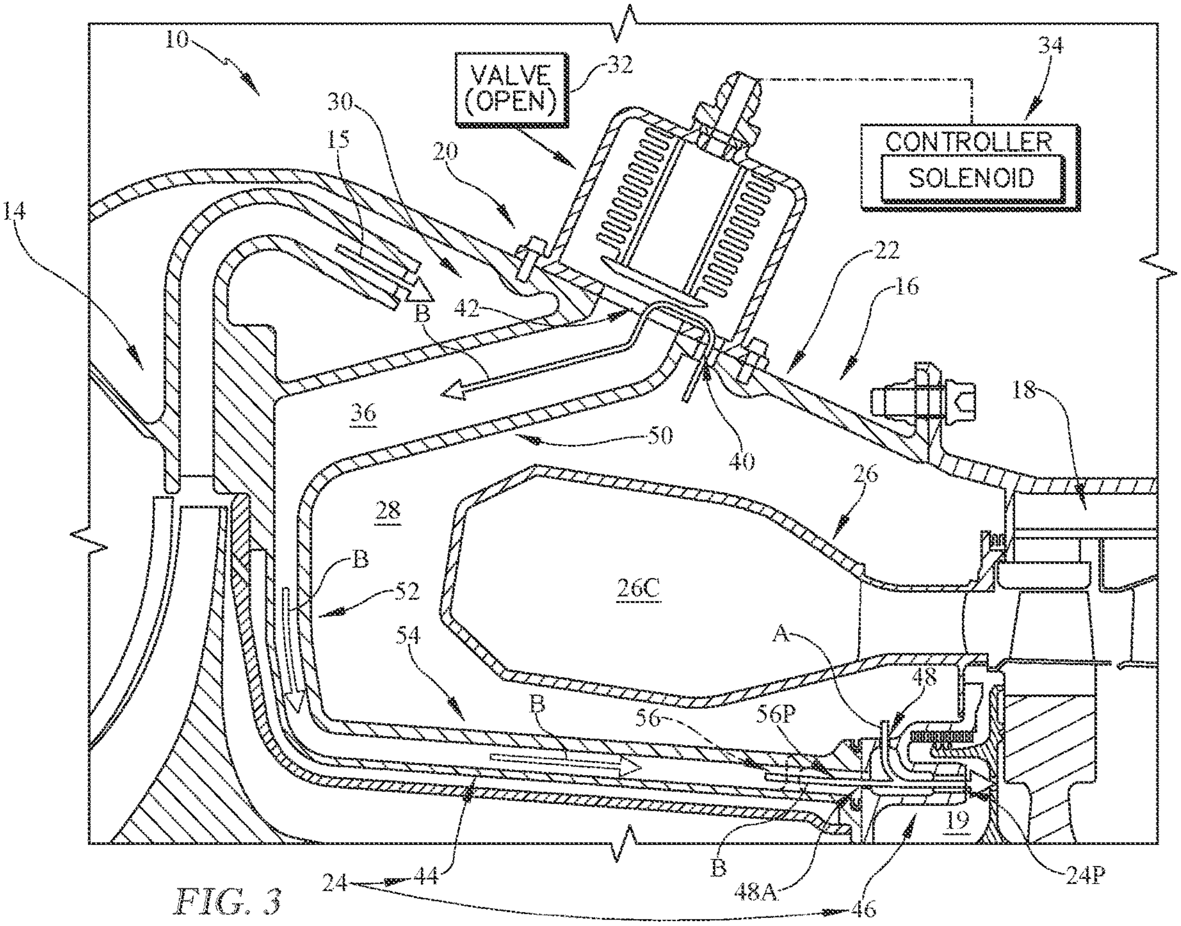
FIG. 3 is a cross section view similar to FIG. 2 showing the cooling air system includes a duct extending through the combustion chamber and a valve that is in the open position to cause auxiliary air to flow from within the combustion chamber radially outward through the outer combustor case into the valve and through the duct to the cavity to supplement the amount of cooling air provided to the cavity during operation of the gas turbine engine.

An illustrative gas turbine engine 10 includes a fan 12, a compressor 14, such as an axi-centrifugal compressor or an axial compressor, a combustor 16 fluidly coupled to the compressor 14, a turbine 18 fluidly coupled to the combustor 16, and a cooling air system 20 as shown in FIGS. 1-3. The cooling air system 20 is configured to provide a continuous minimum flow of cooling air to the turbine for component cooling and further configured to selectively modulate an additional flow of cooling air to supplement the minimum flow during specific engine operating conditions such as max takeoff. As such, the gas turbine engine 10 may be more efficient throughout the operating envelope and bleed this additional cooling air on demand as desired.

The fan 12 is driven by the turbine 18 and provides thrust for propelling an aircraft. The compressor 14 compresses gases entering the engine 10. The compressor 14 delivers the compressed gases to the combustor 16. The combustor 16 mixes fuel with the compressed gases and ignites the fuel to produce hot, high pressure combustion products. The hot, high pressure combustion products of the combustion reaction in the combustor 16 are directed into the turbine 18 to cause the turbine 18 to rotate about an axis 11 of the gas turbine engine 10. The turbine 18 extracts mechanical work from the hot, high pressure combustion products to drive the compressor 14 and the fan 12. The cooling air system 20 is configured to control the amount of cooling air provided to a cavity 19 located axially between the combustor 16 and the turbine 18.

The combustor 16 includes an outer combustor case 22, an inner combustor case 24, and a combustion liner 26 as shown in FIGS. 1-3. The outer combustor case 22 and the inner combustor case 24 cooperate to define a combustion chamber 28. The combustion liner 26 is located in the combustion chamber 28 and defines a combustion zone 26C. The compressor 14 delivers the compressed gases 15 to the combustion chamber 28 of the combustor 16. The fuel is mixed with the compressed gases 15 in the combustion liner 26 before it is ignited to provide the hot, high pressure combustion products.

Because the components of the turbine 18 are subjected to the hot, high pressure combustion products from the combustor 16, the turbine 18 may be cooled during operation of the gas turbine engine 10. Thus, some of the compressor air from the compressor 14 may be used to cool the vanes and/or the blades in the turbine 18. The inner combustor case 24 is formed to define at least one cooling passage 24P that extends through the inner combustor case 24 and opens into the cavity 19 between the combustor 16 and the turbine 18. The cooling passage 24P allows a direct flow of air from within the combustion chamber 28 to the cavity 19 as indicated by arrow A in FIGS. 2 and 3. In this way, a minimum amount of cooling air is provided to the turbine 18 for all operating conditions of the gas turbine engine 10.

However, the amount of cooling air used to cool the turbine 18 may vary during the operation of the gas turbine engine 10. For example, during maximum takeoff, a large amount of cooling air may be used to cool the turbine blades and/or vanes. Conversely, during cruise, a smaller amount of cooling air may be used. Conventional cooling systems typically have fixed geometry, i.e. a fixed amount of cooling air. As such, the continuous flow of cooling air is set for the maximum use case, such as, for example, max takeoff. This causes engine performance to be less efficient overall because excess cooling air is bled off when it is not needed. The cooling air system 20 is therefore configured to selectively control the amount of cooling air provided to the cavity 19 to cool the turbine 18 and maximize engine efficiency while balancing the amount of cooling air used.

The cooling air system 20 includes a cooling duct 30 coupled with the outer combustor case 22 of the combustor 16, a valve 32 coupled with the outer combustor case 22 of the combustor 16 radially outward of the outer combustor case 22, and a controller 34 coupled to the valve 32 as shown in FIGS. 2 and 3. The cooling duct 30 is arranged to extend along at least a portion of the inner combustor case 24 to define a transfer passageway 36 in fluid communication with the combustion chamber 28 and the cavity 19. The valve 32 is configured to open and close selectively to allow and block fluid communication between the cooling duct 30 and the combustion chamber 28. In this way, the valve 32 modulates auxiliary air flow conducted into the cavity 19 from the combustion chamber 28 via the transfer passageway 36 during operation of the gas turbine engine 10 to selectively supplement the minimum amount of cooling air. The controller 34 is configured to control operation of the valve 32 to modulate the amount of cooling air provided to the cavity 19 during operation of the gas turbine engine 10.

In the illustrative embodiment, the valve 32 is configured to change between a closed position as shown in FIG. 2 and an open position as shown in FIG. 3. In the closed position, the valve 32 blocks fluid communication between the cooling duct 30 and the combustion chamber 28 so that the amount of cooling air provided to the cavity 19 is equal to the minimum amount of cooling air. In the open position, the valve 32 allows fluid communication between the cooling duct 30 and the combustion chamber 28 to provide auxiliary air flow into the cavity 19 via the transfer passageway 36 so that the amount of cooling air provided to the cavity 19 is greater than the minimum amount of cooling air.

In response to low flow conditions, i.e. when lower amounts of cooling air are used such as cruise, landing, taxiing, or climb, the controller 34 directs the valve 32 to be in the closed position as shown in FIG. 2. In this way, only the minimum amount of cooling air is supplied to the turbine 18, as indicated by arrow A. In response to high flow conditions, i.e. when larger amounts of cooling air are used such as max takeoff or climb, the controller 34 directs the valve 32 to be in the open position as shown in FIG. 3. This allows the auxiliary flow of air to flow through the transfer passageway 36 to the cavity 19 to increase the amount of cooling air provided to the cavity 19, as indicated by arrow B.

In the illustrative embodiment, the entire valve 32 is located radially outward of the outer combustor case 22. This allows the valve 32 to be easily replaced as needed.

In the illustrative embodiment, the valve 32 is a bellows valve and the controller 34 is a solenoid. In other embodiments, the valve 32 may be a modulating valve configured to vary the auxiliary flow of air through the transfer passageway 36. The controller 34 may be configured to control the valve 32 to vary the amount of cooling air provided to the cavity 19 by increasing or decreasing the flow rate through the transfer passageway 36 in response to the low flow or high flow conditions. The valve 32 is configured to fail in the open position so that the maximum amount of cooling air is provided to the cavity 19 in response to the valve 32 failing or being damaged.

Turning again to the combustor 16, the outer combustor case 22 is formed to include an inlet aperture 40 and an outlet aperture 42 as shown in FIGS. 2 and 3. The inlet aperture 40 fluidly connects the valve 32 and the combustion chamber 28 and the outlet aperture 42 fluidly connects the valve 32 and the transfer passageway 36 to allow the auxiliary air to flow from the combustion chamber 28 through the valve 32 and into the cooling duct 30 in response to the valve 32 being in the open position.

Figure 4:
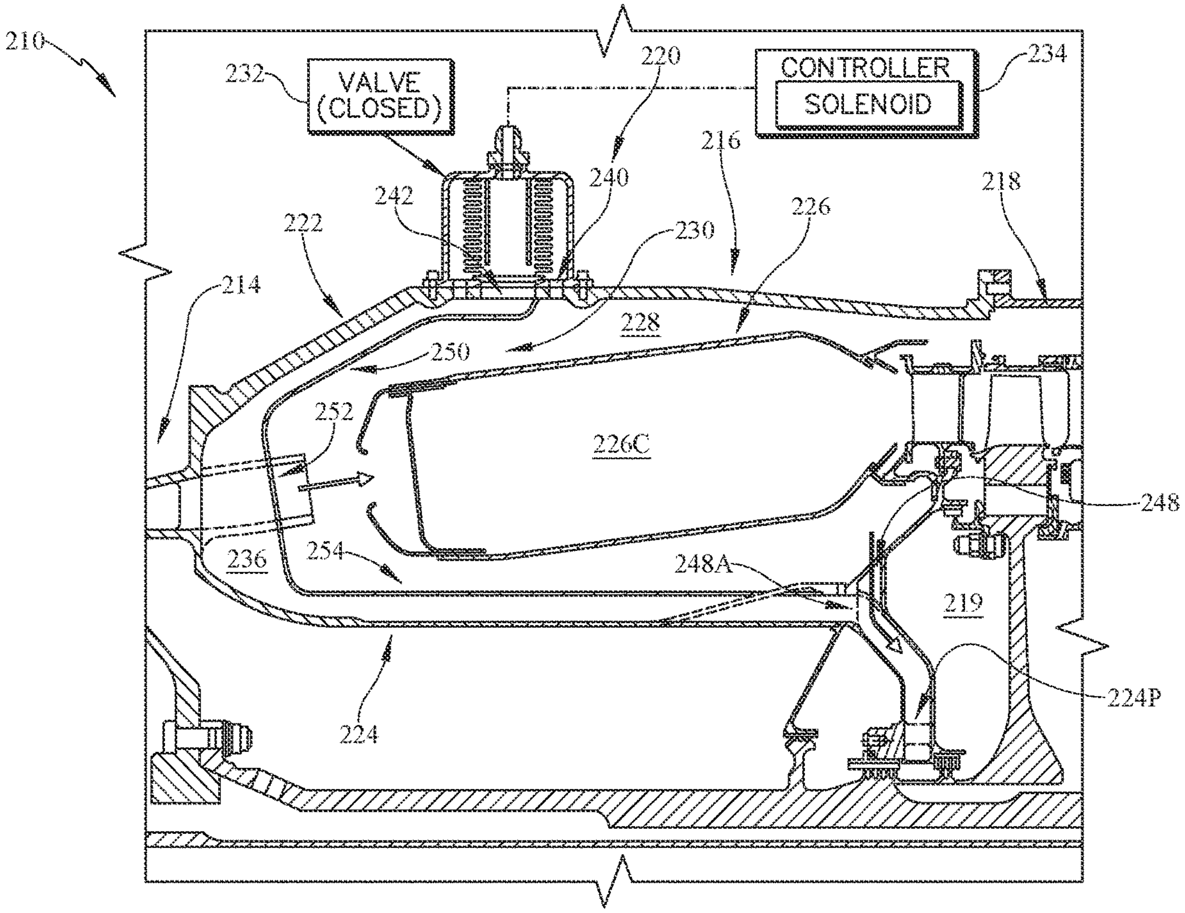
FIG. 4 is a cross section view of another embodiment of a gas turbine engine having an axial compressor, a combustor that includes an outer combustor case and an inner combustor case that cooperate to define a combustion chamber, and a cooling air system that includes a cooling duct arranged to extend along the outer and inner combustor cases to define a transfer passageway in fluid communication with the combustion chamber and the cavity and a valve coupled with the outer combustor case of the combustor radially outward of the outer combustor case and configured to change between a closed position and an open position as shown in FIG. 5.
Figure 5:
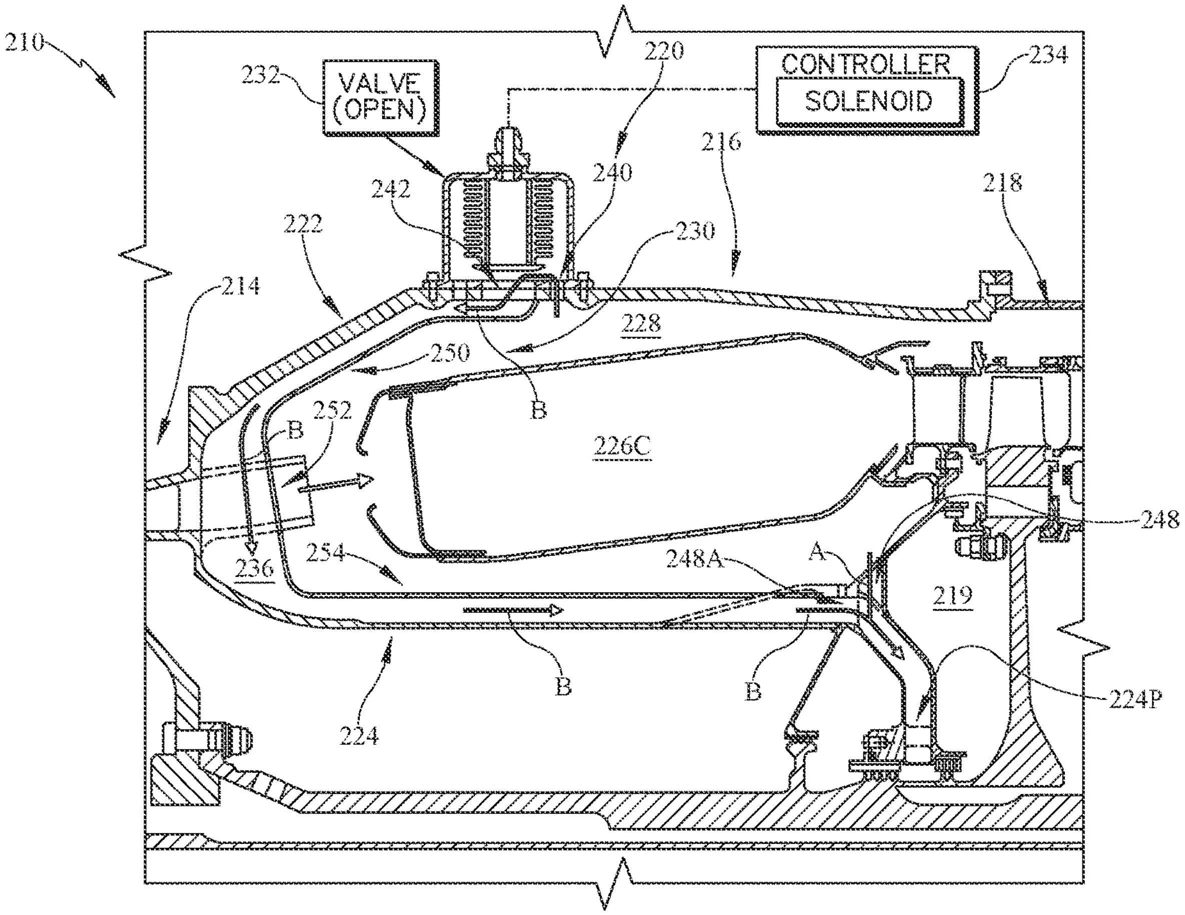
FIG. 5 is a cross section view similar to FIG. 4 showing the valve is in the open position to cause auxiliary air to flow from within the combustion chamber radially outward through the outer combustor case into the valve and through the transfer passageway of the cooling duct to the cavity to increase the amount of cooling air provided to the cavity during operation of the gas turbine engine.

In the illustrative embodiment, the valve 32 is configured to open and close selectively to allow and block fluid communication between the cooling duct 30 and the combustion chamber 28 through the inlet and outlet apertures 40, 42 as shown in FIGS. 4 and 5. In the closed position, the valve 32 closes the outlet aperture 42 to block fluid communication between the cooling duct 30 and the combustion chamber 28, while the inlet aperture 40 remains uncovered.

In the open position, the valve 32 opens the outlet aperture 42 to allow fluid communication between the cooling duct 30 and the combustion chamber 28. The high pressure air from the combustion chamber 28 is thus allowed to flow through the inlet aperture 40 into the valve 32 and through the outlet aperture 42 into the cavity 19 via the transfer passageway 36.

In response to a low flow condition, i.e. when lower amounts of cooling air are used, the controller 34 directs the valve 32 to be in the closed position. In this way, the minimum amount of cooling air is supplied to the turbine 18 through the cooling passages 24P. No auxiliary air is supplied by the cooling duct 30. The low flow condition may include cruise of the aircraft.

In response to a high flow condition, i.e. when larger amounts of cooling air are used, the controller 34 directs the valve 32 to be in the open position. This allows the auxiliary air to flow into the valve 32 through the inlet aperture 40, through the outlet aperture 42 into the transfer passageway 36, and through the transfer passageway 36 to the cooling passages 24P. This increases the amount of cooling air provided to the cavity 19 to provide the turbine 18 with the needed amount of cooling. The high flow condition may include takeoff of the aircraft.

In the illustrative embodiment, the controller 34 directs the valve 32 to be in a fully opened position in response to the high flow condition. In other embodiments, the controller 34 may direct the valve 32 to partially open to vary the amount of cooling air provided to the cavity 19. The controller 34 may vary the open position of the valve 32 to increase or decrease the flow rate through the transfer passageway 36 in response to the low flow or high flow conditions.

The controller 34 may include two valves 32 in case one were to fail. Failure in the internal plumbing may cause the controller 34 to direct the valve 32 to be in the open position.

The inner combustor case 24 includes a combustor forward inner case 44 and a combustor rear inner case 46 as shown in FIGS. 2 and 3. The cooling duct 30 extends along the combustor forward inner case 44 to define the transfer passageway 36. The combustor rear inner combustor case 46 is formed to define the cooling passage 24P. The cooling passage 24P extends through the combustor rear inner combustor case 46 and opens into the cavity 19 to allow the primary flow of air from within the combustion chamber to the cavity 19.

In the illustrative embodiment, the combustor rear inner case 46 is formed to include a primary inlet opening 48 and an auxiliary inlet opening 48A that both open into the cooling passage 24P as shown in FIGS. 2 and 3. The primary inlet opening 48 allows the primary flow of air from within the combustion chamber to flow directly through into the cooling passage 24P. The auxiliary inlet opening 48A is in fluid communication with the transfer passageway 36 so that the auxiliary air flows from the transfer passageway 36 through the auxiliary inlet opening 48A, through the cooling passage 24P, and into the cavity 19.

In the illustrative embodiment, the primary inlet opening 48 and the auxiliary inlet opening 48A are in plane, such that the openings 48, 48A are circumferentially aligned. In other embodiments, the primary inlet opening 48 and the auxiliary inlet opening 48A are spaced apart circumferentially, such that the openings 48, 48A are circumferentially offset.

In the illustrative embodiment, the combustor rear inner case 46 is shaped to define a pre-swirler as shown in FIGS. 2 and 3. The cooling passage 24P forms the pre-swirl passageway.

Turning again to the to the cooling air system 20, the cooling duct 30 includes an outer section 50, a radial section 52, and an inner section 54 as shown in FIGS. 2 and 3. The outer section 50 extends axially forward away from the valve 32. The radial section 52 extends radially inward from the outer section 50 along the combustor forward inner case 44. The inner section 54 extends axially aft from the radial section 52 along the combustor forward inner case 44.

In the illustrative embodiment, the sections 50, 52, 54 of the cooling duct 30 extend around and avoid contact with the combustion liner 26. The outer section 50 is located radially between the outer combustor case 22 and the combustion liner 26. The radial section 52 is located axially forward of the combustion liner 26. The inner section 54 is located radially between the combustion liner 26 and the combustor forward inner case 44 of the inner combustor case 24.

In the illustrative embodiment, the cooling duct 30 cooperates with the outer and inner combustor cases 22, 24 to form the transfer passageway 26. In other embodiments, the outer section 50, the radial section 52, and the inner section 54 of the cooling duct 30 may be separate from the outer and inner combustor cases 22, 24.

In the illustrative embodiment, the combustor rear inner case 46 is formed to include a plurality of cooling passages 24P and the cooling duct 30 includes an annular manifold 56 in fluid communication with the cooling passages 24P as shown in FIGS. 2 and 3. The plurality of cooling passages 24P are spaced apart circumferentially around the inner combustor case 24. Each of the cooling passages 24P extends through the inner combustor case 24 and opens into the cavity 19. The annular manifold 56 is arranged to extend circumferentially around the inner combustor case 24 of the combustor 16 to define a plenum 56P in fluid communication with the transfer passageway 36 and the cooling passages 24P.

In the illustrative embodiment, the combustor rear inner case 46 is formed to include primary and auxiliary inlet openings 48, 48A for each cooling passage 24P. The auxiliary air flows from the transfer passageway 36 into the plenum 56P of the annular manifold 56 where the auxiliary air is provided to each of the auxiliary inlet openings 48A.

In the illustrative embodiment, the inner section 54 of the cooling duct 30 extends from the radial section 52 along the combustor forward inner case 44 to the annular manifold 56 as shown in FIGS. 2 and 3. In other embodiments, the annular manifold 56 may be located at a different location along the cooling duct 30.

For example, the outer section 50 may extend axially forward from the outer combustor case 22 to the annular manifold 56 and a plurality of inner sections 54 may each extend axially aft from the annular manifold 56 to the inner combustor case 24. Each of the inner sections 54 may be in fluid communication with one of the cooling passages 24P. In some embodiments, the cooling duct 30 may include four inner sections 54 that extend from the annular manifold to a corresponding cooling passage 24P formed in the combustor rear inner case 46.

Another embodiment of a gas turbine engine 210 in accordance with the present disclosure is shown in FIGS. 4 and 5. The gas turbine engine 210 is substantially similar to the gas turbine engine 10 shown in FIGS. 1-3 and described herein. Accordingly, similar reference numbers in the 200 series indicate features that are common between the gas turbine engine 10 and the gas turbine engine 210. The description of the gas turbine engine 10 is incorporated by reference to apply to the gas turbine engine 210, except in instances when it conflicts with the specific description and the drawings of the gas turbine engine 210.

The gas turbine engine 210 includes a compressor 214, a combustor 216 fluidly coupled to the compressor 214, a turbine 218 fluidly coupled to the combustor 216, and a cooling air system 220 as shown in FIGS. 4 and 5. In the illustrative embodiment, the compressor 214 is an axial compressor instead of an axi-centrifugal compressor 14, like the compressor 14 in the embodiment of FIGS. 1-3.

The combustor 216 includes an outer combustor case 222, an inner combustor case 224, and a combustion liner 226 as shown in FIGS. 4 and 5. The outer combustor case 222 and the inner combustor case 224 that cooperate to define a combustion chamber 228. The combustion liner 226 is located in the combustion chamber 228 and defines a combustor zone 226C. The compressor 14 delivers the compressed gases to the combustion chamber 28 of the combustor 16. The fuel is mixed with the compressed gases in the combustion liner 26 before it is ignited to provide the hot, high pressure combustion products.

The inner combustor case 224 is formed to define at least one cooling passage 224P that extends through the inner combustor case 224 and opens into a cavity 219 between the combustor 216 and the turbine 218. The cooling passage 224P allows a primary flow of air from within the combustion chamber 228 to the cavity 19 to maintain a minimum amount of cooling air provided to the turbine 218 all operating conditions of the gas turbine engine 10.

The cooling air system 220 includes a cooling duct 230 coupled with the outer combustor case 222 of the combustor 216, a valve 232 coupled with the outer combustor case 222 of the combustor 16 radially outward of the outer combustor case 222, and a controller 234 coupled to the valve 232 as shown in FIGS. 4 and 5. The cooling duct 230 is arranged to extend along the outer combustor case 22 and the inner combustor case 224 to define a transfer passageway 236 in fluid communication with the combustion chamber 228 and the cavity 219. The valve 232 is configured to open and close selectively to allow and block fluid communication between the cooling duct 230 and the combustion chamber 228 to modulate auxiliary air flow conducted into the cavity 219 from the combustion chamber 28 via the transfer passageway 236. The controller 234 is configured to control operation of the valve 232 to modulate the amount of cooling air provided to the cavity 219 during operation of the gas turbine engine 210.

In the illustrative embodiment, the valve 32 is configured to change between a closed position as shown in FIG. 4 and an open position as shown in FIG. 5. In the closed position, the valve 232 closes an outlet aperture 242 formed in the outer combustor case 222 to blocks fluid communication between the cooling duct 230 and the combustion chamber 228. In the open position, the valve 232 opens the outlet aperture 242 to allow fluid communication between the cooling duct 230 and the combustion chamber 228 to provide auxiliary air flow into the cavity 219 via the transfer passageway 236. In the open position, the auxiliary air flows through an inlet aperture 240 formed in the outer combustor case 222 into the valve 232, through the outlet aperture 242 into the transfer passageway 236, and through the transfer passageway 236 into the cavity 219.

In the illustrative embodiment, the cooling duct 230 includes an outer section 250, a radial section 252, and an inner section 254 as shown in FIGS. 4 and 5. The outer section 250 extends axially forward away from the valve 232 along the outer combustor case 222. The radial section 252 extends radially inward from the outer section 250. The inner section 254 extends axially aft from the radial section 252 along the inner combustor case 224.

In the illustrative embodiment, the inner combustor case 224 is formed to include a primary inlet opening 248 and an auxiliary inlet opening 248A that both open into the cooling passage 224P as shown in FIGS. 4 and 5. The primary inlet opening 248 allows the primary flow of air from within the combustion chamber to flow through into the cooling passage 224P. The auxiliary inlet opening 248A is in fluid communication with the transfer passageway 236 so that the auxiliary air flows from the transfer passageway 236 through the auxiliary inlet opening 248A, through the cooling passage 224P, and into the cavity 219.

Gas turbine engines may have air cooled high pressure turbines. This cooling may be primarily used to cool the turbine blades and vanes. The amount of cooling may be dependent on a few factors such as desired life, temperatures, and mission of the engine. Some portions of the mission, such as maximum takeoff, may have a significant impact on life and may have a large weight in setting the amount of cooling flow. Other points, such as cruise, may have almost no impact on life, but cooling circuits often use fixed geometry, which leads to a fixed amount of cooling air. This fixed amount of cooling air overcools the blades during low flow conditions. Reducing the cooling air at points like cruise may have a negligible impact on turbine life and allow for better engine efficiency at those points.

The gas turbine engine 10, 210 includes the cooling air system 20, 220 that sets out a way to vary the amount of cooled air sent to the turbine 18, 218. In the illustrative embodiment, the valve 32, 232 included in the system 20, 220 has two settings: a low flow condition as shown in FIGS. 2 and 4 and a high flow condition as shown in FIGS. 3 and 5. In other embodiments, the valve 32, 232 may be configured to have multiple settings, i.e. a high flow, medium flow, and a low flow. In some embodiments, the valve 32, 232 may be modulated and configured to vary the flow according to the amount of cooling air needed.

If any part of the system 20, 220 fails, then the controller 34, 234 may be configured to flow more than the desired air to protect the turbine 18, 218 (i.e. fail to baseline, higher flow, state).

Additionally, moving parts of the system 20, 220 may be line replaceable units (LRUs) that can be easily replaced as needed. Moving parts of the system 20, 220 may consist of the valve 32, 232 and solenoid included in the controller 34, 234 to operate the valve 32, 232. Potentially, the valve 32, 232 may have a built in means of control rather than a separate solenoid.

The cooling air system 20 may use a single valve 32 that has only two settings: high and low flow. All of the high pressure air going to the turbine 18 passes through orifices in the combustor rear inner case (CRIC) 46. This may be where the air is metered.

In the illustrative embodiment, the CRIC 46 may be divided into 2 regions. One that is open to the high pressure air, i.e. opening 48, and one that is plumbed to our modulating valve, i.e. auxiliary opening 48A. The area that is always open to the high pressure air correlates to the minimum flow the turbine needs. The area plumbed to the valve 32 is what we are controlling. This flow area is open when full flow is needed and closed off when lower flow is needed (such as at cruise). The other side is always open to the high pressure air.

The valve 32 is configured to open and close the passageway 36 to the high pressure source. The valve 32 is located on the outside of the outer combustor case 22 to make it easily replaceable. Multiple passages and valves may be used to enable more than two flow conditions. The valves 32 may be spaced apart circumferentially around the axis 11. For each valve 32 there may be a corresponding transfer passageway 36 defined by a cooling duct 30.

Alternatively, a modulating valve 32 may be used to meter the flow rather than using a simpler open/closed valve. In the illustrative embodiment, the valve 32 may controlled by a solenoid.

Various valve types may be used. In the illustrative embodiment, a bellows valve 32 was selected to minimize the chance of the valve 32 sticking in the low flow condition due to contamination. If any of the external lines were to fail, the valve 32 may go to the high flow condition. The solenoid has two valves in it in case one were to fail. A failure in the internal plumbing would cause it to open to the high flow source.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:

a turbine including a turbine rotor mounted for rotation about an axis of the gas turbine engine and a turbine blade coupled to the turbine rotor for rotation therewith, a combustor including an outer combustor case and an inner combustor case that cooperate to define a combustion chamber, the combustor defines a cooling passage that directs air toward the turbine rotor and the inner combustor case is formed to include a primary inlet opening that directly fluidly connects the combustion chamber and the cooling passage to conduct a flow of primary cooling air from the combustion chamber directly into the cooling passage to provide a continuous flow of primary cooling air to the cooling passage to cool the turbine, and a cooling air system that includes a cooling duct arranged to extend along at least a portion of the inner combustor case to define a transfer passageway in fluid communication with the combustion chamber and the cooling passage and a valve coupled with the outer combustor case and fluidly connected with the cooling duct, wherein the primary inlet opening is unobstructed during all operating conditions of the gas turbine engine so that the flow of primary cooling air is continuously provided through the primary inlet opening and to the turbine, and the valve is configured to open and close selectively to allow and block fluid communication between the transfer passageway and the combustion chamber to modulate a flow of auxiliary cooling air conducted into the cooling passage via the transfer passageway to selectively supplement the flow of primary cooling air.

2. The gas turbine engine of claim 1, wherein the transfer passageway is fluidly connected with the cooling passage through an auxiliary inlet opening formed in the inner combustor case, the auxiliary inlet opening being spaced apart from the primary inlet opening.

3. The gas turbine engine of claim 2, wherein the primary inlet opening extends radially through the inner combustor case and the auxiliary inlet opening extends axially through the inner combustor case.

4. The gas turbine engine of claim 3, wherein the flow of auxiliary cooling air is conducted from the combustion chamber, through the transfer passageway, and through the auxiliary inlet opening into the cooling passage to combine with the flow of primary cooling air therein to form a flow of combined cooling air, and the cooling passage includes an outlet that directs the flow of combined cooling air toward the turbine.

5. The gas turbine engine of claim 1, wherein the cooling duct includes an annular manifold that extends circumferentially around the inner combustor case and fluidly connects the transfer passageway with the cooling passage, and wherein the transfer passageway extends at least partially circumferentially about the axis.

6. The gas turbine engine of claim 1, wherein the outer combustor case is formed to include an inlet aperture that fluidly connects the valve and the combustion chamber and an outlet aperture that fluidly connects the valve and the cooling duct to allow the flow of auxiliary cooling air to flow from the combustion chamber through the valve and into the cooling duct in response to the valve being in an open position.

7. The gas turbine engine of claim 1, wherein the entire valve is located radially outward of the outer combustor case.

8. The gas turbine engine of claim 1, further comprising a controller coupled to the valve and configured to direct the valve to open in response to a high-flow condition of the gas turbine engine to allow fluid communication between the cooling duct and the combustion chamber so that the flow of auxiliary cooling air flows into the cooling passage.

9. The gas turbine engine of claim 1, further comprising a controller coupled to the valve and configured to direct the valve to close in response to a low-flow condition of the gas turbine engine to block fluid communication between the cooling duct and the combustion chamber so that the flow of auxiliary cooling air does not flow into the cooling passage.

10. The gas turbine engine of claim 9, wherein, in response to the valve being closed, the cooling passage receives the flow of primary cooling air from the combustion chamber through the primary inlet opening without receiving the flow of auxiliary cooling air from the cooling duct, and the cooling passage includes an outlet that directs the flow of primary cooling air toward the turbine.

11. A gas turbine engine comprising:

a turbine having a rotor and a blade that extends radially away from the rotor relative to an axis, a combustor that defines a combustion chamber, a cooling passage that opens into a cavity formed between the combustor and the turbine, and a primary inlet opening that opens directly into the cooling passage to fluidly connect the combustion chamber with the cooling passage and continuously direct a flow of primary cooling air from the combustion chamber through the cooling passage and into the cavity, and a cooling air system that includes a cooling duct arranged to extend along the combustor to define a transfer passageway in fluid communication with the combustion chamber and the cooling passage and a valve coupled with the combustor and fluidly connected with the cooling duct, and the valve configured to selectively control fluid communication between the cooling duct and the combustion chamber to modulate a flow of secondary cooling air conducted through the transfer passageway and the cooling passage into the cavity to supplement the flow of primary cooling air.

12. The gas turbine engine of claim 11, further comprising a controller coupled to the valve and configured to direct the valve to open in response to a high-flow condition of the gas turbine engine to allow fluid communication between the cooling duct and the combustion chamber, and wherein, in response to the valve being opened, the flow of secondary cooling air and the flow of primary cooling air combine in the cavity.

13. The gas turbine engine of claim 12, wherein the controller is configured to direct the valve to close in response to a low-flow condition of the gas turbine engine to block fluid communication between the cooling duct and the combustion chamber, and wherein, in response to the valve being closed, the flow of secondary cooling air does not combine with the flow of primary cooling air in the cavity.

14. The gas turbine engine of claim 11, wherein an outer combustor case included in the combustor is formed to include an inlet aperture that fluidly connects the valve and the combustion chamber and an outlet aperture that fluidly connects the valve and the transfer passageway to allow the flow of secondary cooling air to flow into the transfer passageway in response to the valve being in an open position.

15. The gas turbine engine of claim 11, wherein the entire valve is located radially outward of the combustor.

16. The gas turbine engine of claim 11, wherein the transfer passageway is fluidly connected with the cooling passage through an auxiliary inlet opening formed in the combustor, the auxiliary inlet opening being spaced apart from the primary inlet opening, and wherein the primary inlet opening extends radially through the combustor to open directly into the cooling passage and the auxiliary inlet opening extends axially through the combustor to open directly into the cooling passage.

17. The gas turbine engine of claim 11, wherein the flow of primary cooling air is directed radially inward from the combustion chamber to the cooling passage through the primary inlet opening and the flow of primary cooling air is directed axially aft from the cooling passage to the cavity through an outlet of the cooling passage.

18. A method of operating a gas turbine engine, the method comprising:

conducting a flow of primary air from within a combustion chamber of a combustor included in the gas turbine engine directly into a cooling passage via a primary inlet opening formed in the combustor during all operating conditions of the gas turbine engine, directing a flow of auxiliary air from the combustion chamber into the cooling passage to combine with the flow of primary air therein to provide a combined flow of air, directing the combined flow of air to a turbine included in the gas turbine engine, blocking the flow of auxiliary air from flowing from the combustion chamber into the cooling passage, and directing only the flow of primary air from the cooling passage to the turbine after blocking the flow of auxiliary air.

19. The method of claim 18, further comprising directing the flow of auxiliary air radially outward of an outer combustor case of the combustor from the combustion chamber and directing the flow of auxiliary air radially inward of the outer combustor case into the cooling passage after directing the flow of auxiliary air radially outward of the outer combustor case.

20. The method of claim 18, further comprising directing the flow of primary air radially inward from the combustion chamber to the cooling passage via the primary inlet opening and directing the flow of primary air axially aft through an outlet of the cooling passage to the turbine.

* * * * *